Aug. 26, 1952 — M. D. SHUMAKER — 2,608,363
JET BLAST DEFLECTOR
Filed Oct. 12, 1949 — 4 Sheets-Sheet 2
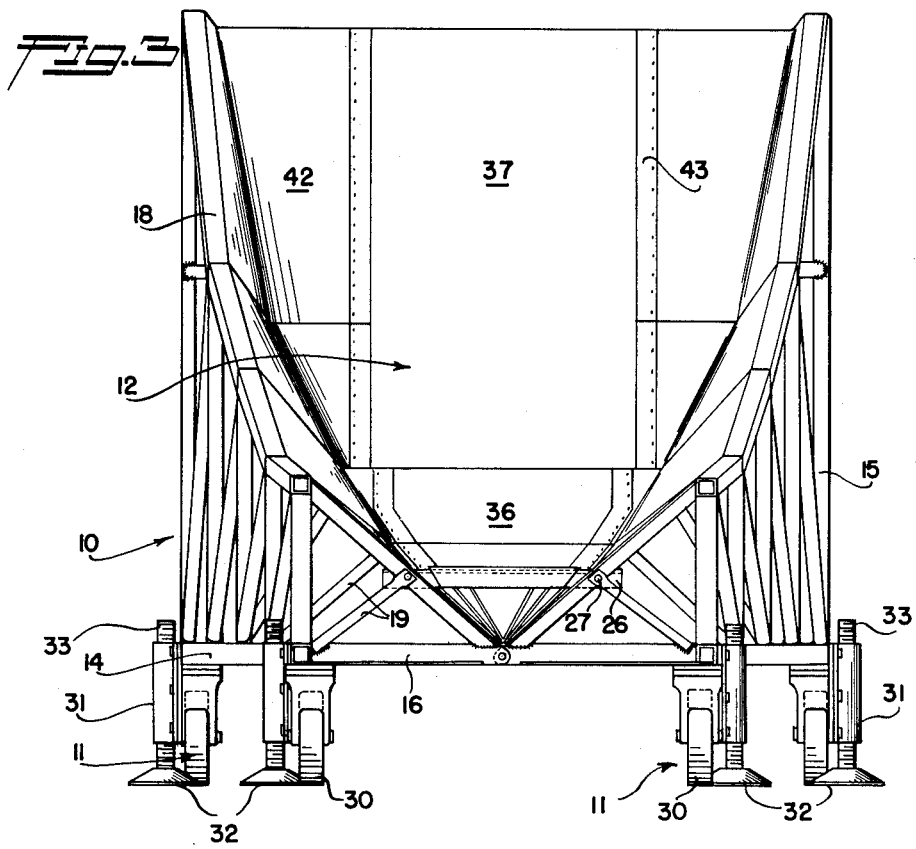
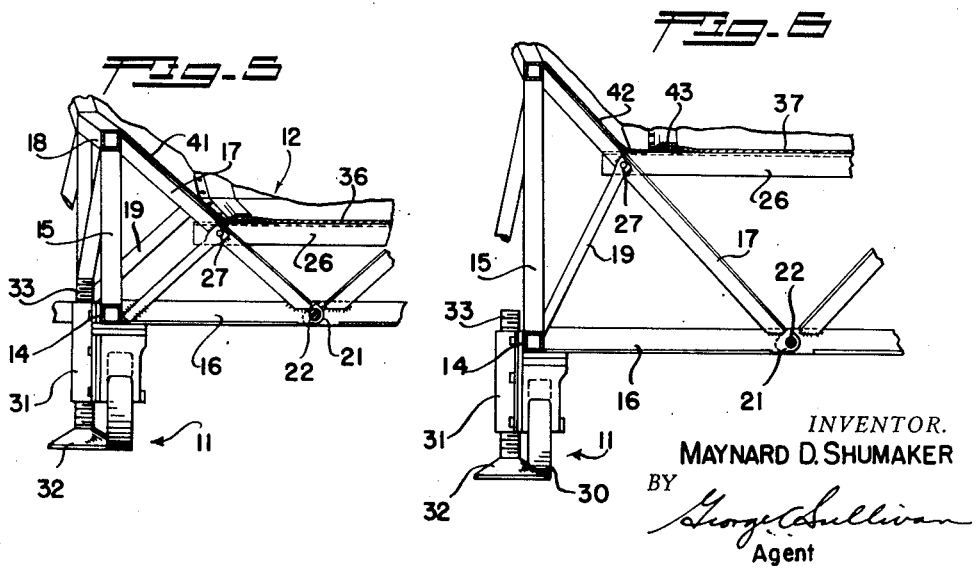
*INVENTOR.*
MAYNARD D. SHUMAKER
BY
George C. Sullivan
Agent

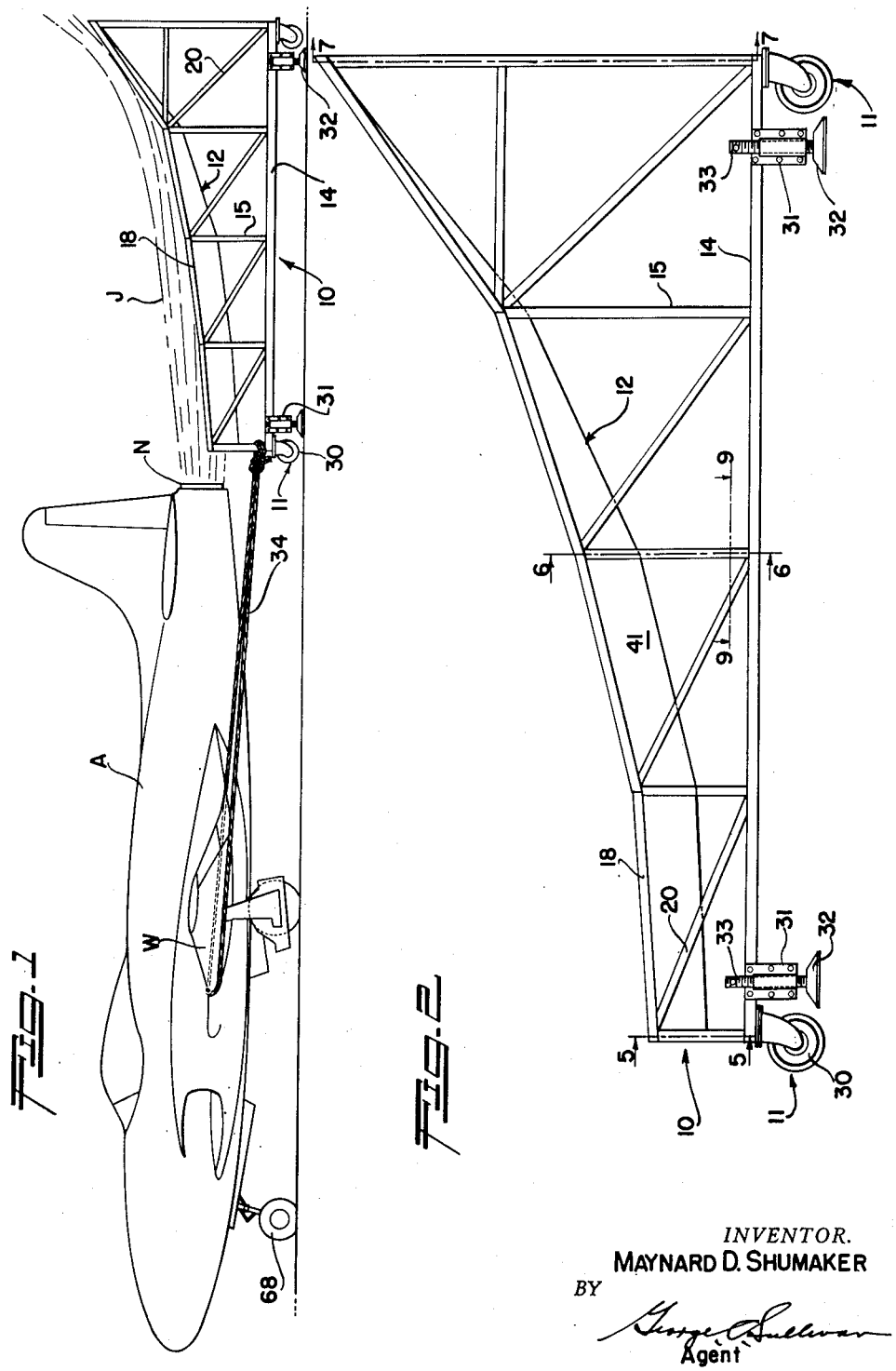

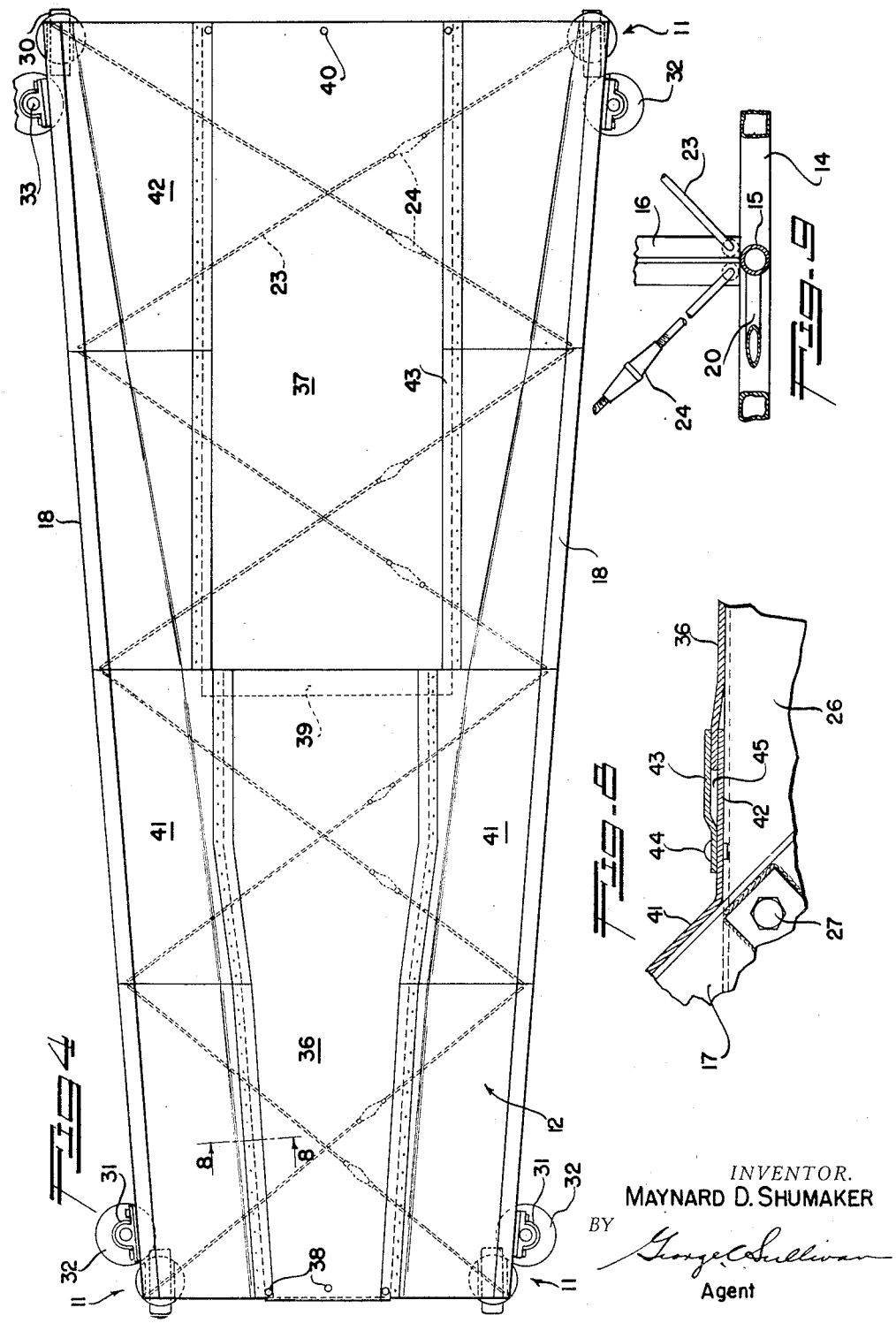

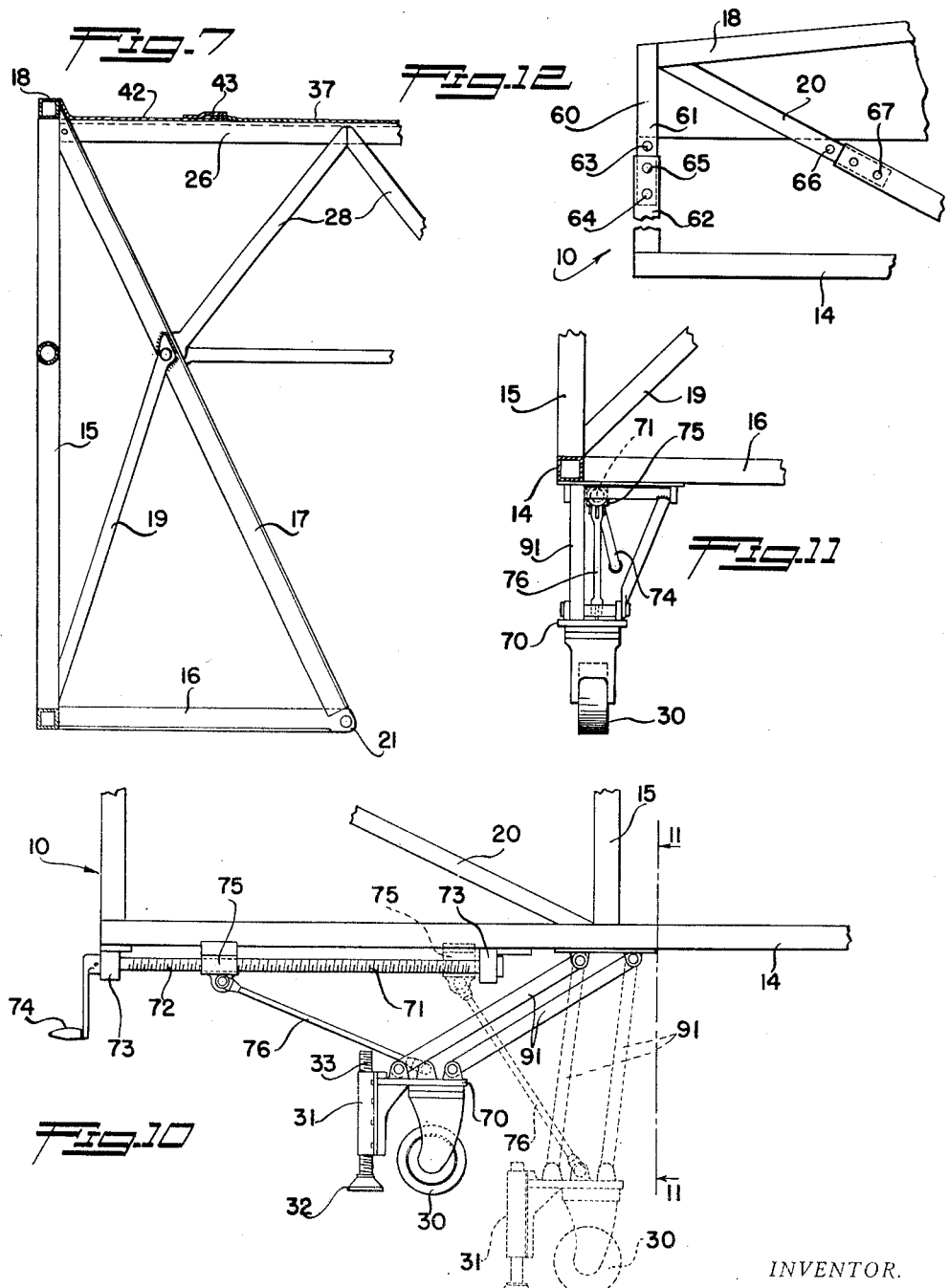

Patented Aug. 26, 1952

2,608,363

UNITED STATES PATENT OFFICE 2,608,363

JET BLAST DEFLECTOR

Maynard D. Shumaker, Burbank, Calif., assignor to Lockheed Aircraft Corporation, Burbank, Calif.

Application October 12, 1949, Serial No. 120,865

9 Claims. (Cl. 244—1)

This invention relates to apparatus for use at airports, on aircraft carriers, and at other places where airplanes are warmed up, tested, serviced, etc., and relates more particularly to means for deflecting the high temperature, high velocity jets of air and gases issuing from the nozzles of the turbo-jet and turbo-propeller engines of aircraft.

Reactive propulsive aircraft power plants such as the so-called jet engines, produce concentrated, high velocity streams or jets of high temperature air and gases of combustion. In warming up and testing such engines the jet blasts are extremely hazardous and a person inadvertently entering such a blast, even at a point several feet behind the airplane, is liable to be killed or at least seriously injured. Accordingly, it has been necessary to take unusual precautions when servicing, testing, and warming up such engines, and to arrange the airplane in a location where there is a large, open unusable space behind the airplane. The jet blasts of these power plants also create a roar or sound that cannot be borne or withstood by the workmen for any prolonged period without the use of ear protectors, ear muffs, etc. and even with such preventative measures the jet noise produces undesirable physiological reactions. The sound of jet engine blasts travels great distances and annoys the occupants of property located considerable distances from the air field. These considerations have made the testing, servicing, and warming up of jet type aircraft hazardous and expensive operations and have necessitated the provision of large areas for carrying out such activities. The blast fences or blast walls often used at air fields and designed to partially deflect and break up the relatively low velocity and low temperature air blasts created by propellers are wholly inadequate to deflect the hot, high velocity jets of jet engines.

It is a general object of the present invention to provide a simple, practical, and effective deflector means for use where jet engined aircraft are to be warmed up, serviced, tested, etc.

Another object of the invention is to provide a deflector means that serves to direct the high temperature and high velocity jet upwardly at a point a short distance behind the nozzle of the engine to eliminate the hazard of personnel coming into contact with the hot blast and to conserve space. The deflector of the invention is adapted to be arranged immediately at the rear of the jet nozzle to directly receive the hot jet and is designed to divert the jet stream upwardly and rearwardly in such a manner that a person may walk or pass to the rear of the deflector without danger. The deflector itself, while of limited longitudinal extent, forms an obstruction or barrier to prevent a person from passing immediately behind the nozzle and fully diverts the jet in such a manner that the space to the rear of the deflector is safe and undisturbed so as to be usable for other operations. Thus the deflector, in addition to removing a serious hazard, conserves space in the warming up and servicing area. The considerations well adapt the deflector for use on the decks of aircraft carriers and in other places where the space available for the warming up and testing operations is limited.

Another object of the invention is to provide a jet deflector of the character referred to that materially lessens the effects and annoyance of the jet blast noise. The deflector is trough or channel-shaped in transverse cross section and is so constructed as to direct or divert the jet to greatly reduce the sound heard at the warming up area as well as at remote points. The side walls of the channel-like deflector prevent the lateral or horizontal propagation of the jet noise to reduce the sound level at the field and the deflector is gradually curved or inclined upwardly to smoothly divert the jet stream upwardly without unnecessary interference or obstruction, the smooth upward diversion of the jet into the air above the ground level apparently greatly reducing the audible sound level. In actual operations it has been observed that the deflector not only reduces the sound level in the immediate vicinity of the airplane but also lessens the sound level at points remote from the airplane where the jet noise had previously been very objectionable and the source of considerable annoyance.

Another object of the invention is to provide a deflector of the class mentioned that is portable so as to be readily moved from one engine to another and from one airplane to another. The portable feature expedites the engine testing and warming up operations particularly where a number of airplanes are in the service area.

Another object of the invention is to provide a jet deflector wherein provision is made for the differential thermal expansion and contraction of the parts subjected to the heat of the jet stream. The deflector includes slip joints between the central panels or sheets in the path of the jet and between the central panels and the side panels so that there is no buckling or distortion of the parts as a result of heating and cooling during and following use of the deflector.

A further object of the invention is to provide a jet deflector that may be readily adjusted vertically or raised and lowered to adapt it for use with various aircraft and engines. Either the forward end or the aft end, or both, of the deflector may be moved or adjusted vertically to bring the active trough or channel of the deflector into the desired relation to the nozzle of the jet engine.

A still further object of the invention is to provide a jet deflector that may be packed or crated in two principal parts for shipment and then readily assembled for use or operation.

Other objectives and features of the invention will become apparent from the following detailed description of several typical forms or embodiments of the invention, throughout which description reference is made to the accompanying drawings, in which:

Figure 1 is a side elevation of a jet deflector of the invention in the operative position at the nozzle of a jet airplane;

Figure 2 is an enlarged side elevation of the deflector illustrated in Figure 1;

Figure 3 is a front elevation of the deflector;

Figure 4 is a plan view of the deflector with the tie rods appearing in broken lines;

Figures 5 and 6 are enlarged fragmentary vertical sectional views taken substantially as indicated by lines 5—5 and 6—6 respectively on Figure 2;

Figure 7 is a fragmentary vertical sectional view of the rear portion of the deflector, being a view taken substantially as indicated by line 7—7 on Figure 2;

Figure 8 is an enlarged fragmentary vertical sectional view taken substantially as indicated by line 8—8 on Figure 4;

Figure 9 is an enlarged fragmentary horizontal sectional view taken substantially as indicated by line 9—9 on Figure 2;

Figure 10 is a fragmentary side elevation of a corner or end portion of another embodiment of the invention;

Figure 11 is a fragmentary front elevation taken substantially as indicated by line 11—11 on Figure 10; and Figure 12 is a fragmentary side elevation of still another form of the invention.

The jet deflector of the invention, as illustrated in Figures 1 to 9 inclusive, includes, generally, a body or frame 10, wheel or caster means 11 supporting the frame 10 for ready movement, and a trough or channel 12 on the frame 10 for directing or deflecting the jet J issuing from the nozzle N of the jet propelled airplane A.

The function of the frame 10 is to support the channel 12 at the proper height to receive the jet J of hot compressed air and gas. In accordance with the broader aspects of the invention, the frame 10 may be of any appropriate or selected construction. In the particular case illustrated, the frame 10 is an elongate structure that gradually increases in width from its forward end toward its rear end, as best shown in Figure 4. I have illustrated the frame 10 constructed of angle stock, square tubing and round tubing, it being apparent that other materials may be used in fabricating the frame. As mentioned above, the frame 10 is preferably constructed of two main sections that may be conveniently crated for shipment, and then assembled at the field. Each of these two sections includes a longitudinal base member 14 of tubular stock, carrying a plurality of spaced legs or uprights 15 of tubing. The uprights 15 increase in height in the rearward direction, the rearward uprights being considerably higher than the front uprights. Each of the two longitudinal or side sections further includes horizontal chord members 16 extending inwardly from the longitudinal member 14 and angular members 17 extending upwardly and outwardly from the inner ends of the chord members 16 to the upper ends of the uprights 15. The horizontal chord members 16 and the angular members 17 may be formed of angle stock. Upper longitudinal member 18 of tubular stock extend along the tops of the uprights 15. Braces or diagonals 19 extend between the angular members 17 and the chord members 16 or between the angular members 17 and the points of joinder of the chord members and the uprights 15. This construction is best illustrated in Figures 5, 6 and 7. In addition, fore and aft diagonals 20 extend between the upper and lower longitudinal members 14 and 18, as shown in Figure 2. The several parts of the two main frame sections may be welded, riveted, or bolted together.

The two longitudinally extending main sections of the frame 10 are secured together at the medial longitudinal plane of the assembly. For example, the chord members 16 of the two sections may have overlapping ears 21 at their inner ends pinned or bolted together at 22. Horizontal diagonal tie rods 23, provided with turnbuckles 24, extend between and connect the longitudinal base members 14 of the frame assembly to assist in lending rigidity to the structure. The ends of the tie rods 23 may be anchored to the chord members 16 adjacent the longitudinal members 14, as in Figure 9. Horizontal tie and support members 26 of angle stock tubing, or the like, extend transversely in the frame 10 to connect the transversely aligned members 17. Bolts 27 may secure the support members 26 to the angular members 17 and in the case of the several forward members 26 they may be attached to the members 17 at the upper ends of the braces 19 as illustrated in Figures 5 and 6. The elevation of the support members 26 progressively increases in the rearward direction, that is the second to the foremost member 26 is higher than the foremost member, the third to the foremost member 26 is higher than the second member, and so on. As seen in Figure 7, the rearmost member 26 lies in a plane adjacent the top of the rear uprights 15 and is supported by diagonal braces 28. The support members 26 carry the inner or central portion of the channel 12 while the portions of the angular members 17, which continue upwardly beyond the support members 26, carry the sides of the channel, as will be more fully described below.

The wheel or caster means 11 is not essential to the operation of the jet deflector but facilitates handling of the device and permits it to be readily moved from place to place as required. In the form of the invention illustrated in Figures 1 to 9 inclusive, a swivel caster 30 is mounted on each lower corner of the frame 10. When frame 10 is equipped with wheels or casters 30 it is desirable to provide means for holding the frame 10 against movement so that the force of the jet J will not cause rearward movement of the deflector. For this purpose I have shown ground locks 31 secured to the longitudinal members 14 of the frame 10 adjacent the casters 30. The ground locks 31 include ground engaging pads 32 adapted to be actuated by screws 33 to firmly contact the ground or surface of the field to hold the deflector in position. If desired, the ground locks 31 may be supplemented by one or more cables or ropes 34 secured to the forward end of the frame 10 and extending forwardly therefrom to engage around the wing W or other part of the airplane A. Such ropes 34, while not essential, may be found useful in preventing movement of the deflector rearwardly away from the airplane A when the jet J is striking the deflector. Figure 1 illustrates the ground locks 31 in the actuated condition where the frame 10 is raised slightly by the locks to hold the casters 30 clear of the ground level.

The trough or channel 12 is an important element of the invention, serving to receive and direct the hot high velocity jet J. The channel 12 is constructed and shaped to gradually or smoothly deflect the jet J upwardly and rearwardly with a minimum of turbulence and interference and to confine the major lower portion of the jet against lateral escape. In accordance with the invention the jet deflecting channel 12 curves or slopes upwardly and rearwardly from the forward end of the frame 10 and gradually increases in width, or flares rearwardly. The channel 12 includes a central panel made up of two or more sections 36 and 37 and opposite side panels 41. The central panel sections 36 and 37, which are subjected to the high temperature jet J, are preferably constructed of heat and corrosion resistant material such as a suitable stainless steel to resist the heat of the jet blast. The forward section 36 of the central panel rests upon the several forward support members 26 and slopes upwardly and rearwardly at an increasing angle. The forward end of the section 37 is anchored to the frame 10 by bolts or rivets 38 which preferably constitute the sole rigid attachment means for the panel section. The side margins of the section 36 are rearwardly divergent and are spaced inwardly from the adjacent angular members 17 of the frame 10. The rear section 37 of the central panel extends rearwardly from the section 36 to the rear end of the frame 10 and like the section 36 rests upon the support members 26. The section 37 may be substantially rectangular to have parallel side margins. The forward edge of the panel section 37 laps under the rear edge portion of section 36 at 39. Bolts or rivets 40 rigidly attach the rear edge portion of the section 37 to the frame 10, this preferably constituting the sole rigid attachment means for the section 37. The section 37 slopes upwardly at an increasing angle so that the rear portion of the section is pitched at a rather steep angle. In this connection it is to be understood that while I have shown the sections 36 and 37 sloping rearwardly and upwardly, they may curve upwardly and rearwardly to have substantially the same contour. It is to be observed that each section 36 and 37 of the central panel is secured or fixed at only one extremity and that the inner ends of the sections are in overlapping relation so that each section is free to expand and contract axially or longitudinally due to the temperature changes independently of the frame 10 and of the other central panel section. The sections 35 and 37 directly receive the extremely hot jet blast J but being mounted or attached, as just described, are free to expand and contract at will.

The side panels 41 of the channel 12 slope upwardly and outwardly or laterally from each side of the central panel 36—37 and serve to confine or partially confine the jet J against lateral escape and to reduce the propagation of lateral sound waves. The panels 41 are supported on and secured to the sloping members 17 of the frame 10 to extend from the horizontal support members 26 to the upper longitudinal frame members 18. As best shown in Figure 3, the panels 41 not only slope upwardly and laterally but also diverge in the rearward direction so that the trough or channel 12 increases in width rearwardly to accommodate the jet J. The inner portions 42 of the panels 41 turn inwardly to lie in substantially the same planes as the sections 36 and 37 of the central panel. In the particular arrangement illustrated the channel 12 becomes more shallow toward its upper end and the portions 42 of the side panels may be of substantial width at the rear end of the deflector, as seen in Figures 3, 4 and 7, although these portions 42 are quite narrow at the forward end of the deflector, as shown in Figures 5, 6 and 8.

The invention provides slip joints or expansion seams between the margins of the central panel sections 36 and 37 and the side panels 41, one of these joints being illustrated on an enlarged scale in Figure 8. Each expansion seam or joint includes a retainer strip 43 secured to a side panel portion 42. The strips 43 may extend throughout the lengths of the side panels 41 and are secured along their outer margins by screws, bolts, or rivets 44. The remaining or major inner parts of the strips 43 are spaced above the surfaces of the portions 42 to leave gaps or spaces 45 for the reception of the edge portions of the central panels 36 and 37. The margins of the central panels 36 and 37 may be slightly raised or bent upwardly to fit between the strips 43 and the side panel portions 42, the arrangement and relation of parts being such that the margins of the central panels 36 and 37 are yieldingly or frictionally held in the seams or joints. The gaps or spaces 45, between the strips 43 and panel portions 42, are of substantial width, leaving ample space to permit relative thermal expansion and contraction of the central and side panel sections, while retaining engagement at the seams or joints. Thus the central panels 36 and 37 of the channel 12 are free to expand and contract both axially and transversely with respect to the remaining structure of the deflector to avoid buckling and distortion which might otherwise occur as a result of subjecting the deflector to the hot high velocity jet J. The side panels 41 and strips 43 may be formed of low carbon steel, stainless steel, or other heat and corrosion resistant material.

In employing the deflector illustrated in Figures 1 to 9 inclusive, the deflector may be readily rolled or wheeled into position at the rear of the propulsive nozzle N of the airplane A where the forward end of the channel 12 is adjacent the nozzle N and where the deflector is axially aligned with the nozzle. The ground locks 31 are then actuated to hold the deflector in position and, if desired, the ropes 34 may be used to anchor the deflector to the airplane A. In other instances the jet deflector may be stationarily anchored by the ground locks 31 or other means and the airplane A may be brought to the proper position with relation to the deflector. With the airplane and deflector in the correct relation, the jet engine may be warmed up, tested, etc. as required.

The resultant high temperature, high velocity jet J discharges into the channel 12 which, as above described, diverts the jet upwardly and rearwardly, directing it well above the ground level where it would form a hazard or might interfere with other operations at the field. Although the deflector is relatively short, workmen may work behind the deflector and at either side of the deflector without danger of injury from the jet J and airplanes and other equipment may be placed immediately behind the deflector without being subject to the jet J or any substantial accompanying air blasts. Thus the deflector conserves space at the field or service area, making it feasible to warm up and test jet engines in confined areas such as the flight decks of aircraft carriers. In actual usage, it has been found that the deflector materially reduces the noise or sound level not only in the immediate vicinity of the sound generating jet J but also at more remote points where the jet noise would otherwise be exceedingly annoying. It is believed that this action results from directing the jet J upwardly above the ground level by the channel 12 so that the sound propagated by the jet J is dissipated by the upper air, the side panels 41 of the channel 12 serving to limit the lateral propagation at or adjacent the ground level.

Figure 12 illustrates one manner of making the frame 10 vertically extensible and contractable to adapt the deflector for use with a jet aircraft of different types where the nozzles N of the jet engines are at varying heights from the field or ground level. In this construction the uprights 60 of the frame 10, corresponding to the uprights 15, are each constructed to include two telescoping section 61 and 62. One section, for example the section 61, has a plurality of vertically spaced transverse openings 63 and the other section has one or more transverse openings 64. The upper portion of the frame 10 carrying the channel 12 may be adjusted or moved vertically to the desired position and to bring certain openings 63 into alignment with the openings 64 whereupon pins or bolts 65 are inserted in the aligned openings to secure the upper portion of the frame 10 at the desired elevation. The diagonal braces 19 and 20 of the frame 10 are of similar construction, having telescoping sections provided with spaced openings 66 for receiving pins or bolts 67 to retain the active upper portion of the frame 10 at the selected elevation. Either the forward portion or the rear portion, or both, of the deflector may be vertically adjusted in this manner. In this connection it should be understood that adjustment between the nozzle N and the deflector may be obtained with the device shown in Figures 1 to 9 inclusive, by blocking up one or both ends of the deflector or by raising the nose gear 68 of the airplane A so that the nozzle N is directed upwardly to some extent. Further, it is contemplated that the airplane A may be brought onto a ramp or platform to position the nozzle N in the desired relation with respect to the deflector.

Figures 10 and 11 illustrate another means for effecting vertical adjustment of the deflector. In this case the frame 10 and channel 12 may be the same as illustrated in Figures 1 to 9 inclusive but the casters 30 and ground locks 31 at either the forward or rearward end of the frame 10, or both, are adjustably connected with the frame to effect vertical movement of the frame 10 when desired or necessary. The casters 30 and ground locks 31 are secured to the under side of plates 70. Systems of parallel links 91 connect the plates 70 with the lower corner portions of the frame 10, the links being pivotally attached to the plates 70 and to the lower sides of the frame members 14. Actuating screws 71 are rotatably carried by bearings 73 on the frame members 14 and are provided at their outer ends with handles or cranks 74. A traveling nut 75 is threaded on each screw 72 and is held against rotation by contact with the adjacent frame member 14. Links 76 extend between and are pivotally connected with the plates 70 and the related traveling nuts 76. It will be seen that by rotating the screws 73 the frame 10 is raised or lowered. By selectively raising or lowering either end or both ends of the frame 10 the forward end of the channel 12 may be brought to the correct position with respect to the nozzle N of the airplane A. The ground locks 31 may be employed to hold the deflector against movement on the ground or field when the deflector is in operation.

Having described only typical forms of the invention I do not wish to be limited to the specific details herein set forth, but wish to reserve to myself any variations or modifications that may appear to those skilled in the art and fall within the scope of the following claims.

I claim:

1. A jet deflector for deflecting the high temperature jet issuing from the nozzle of the jet engine of an aircraft comprising a support adapted to be positioned behind the nozzle, and a channel on the support having a forward end for receiving the jet from the nozzle and extending upwardly and rearwardly to direct the jet upwardly, the channel including a plurality of main panels each secured to the support at one end only to be free for independent thermal expansion and contraction in the axial direction, side panels rising from the main panels and secured to the support, and slip joints between the main panels and side panels allowing independent thermal expansion and contraction of the main panels in the lateral direction.

2. A jet deflector for deflecting the high temperature jet issuing from the nozzle of the jet engine of an aircraft comprising a support adapted to be positioned behind the nozzle, and a channel on the support having a forward end for receiving the jet from the nozzle and extending upwardly and rearwardly to direct the jet upwardly, the channel including a plurality of central panels each having one end secured to the support, the other ends of the central panels being in relatively movable overlapping engagement so that the central panels are adapted to independently expand and contract in the axial direction, side panels rising from the central panels, and slip joints between the central panels and side panels allowing lateral expansion and contraction of the central panels relative to the side panels.

3. A jet deflector for deflecting the high temperature jet issuing from the nozzle of the jet engine of an aircraft comprising a support adapted to be positioned behind the nozzle, ground-engaging means secured to said support and dependent therefrom, a channel carried on said support having an open forward end for receiving the jet from the nozzle, said channel extending upwardly and rearwardly from its forward end to an open rear end to direct the jet upwardly and rearwardly, said channel comprising a bottom wall, which increases rearwardly in width and slopes upwardly from the forward end of the channel, and upwardly extending side walls which flare laterally outwardly from said bottom wall.

4. A jet deflector for deflecting the high temperature jet issuing from the nozzle of the jet engine of an aircraft comprising a frame adapted to be positioned behind the nozzle, ground-engaging wheels for supporting said frame above the ground, an upwardly-facing channel mounted on top of said frame and having an open forward end to receive the jet from said nozzle, said channel extending rearwardly and upwardly from its forward end to an open rear end to direct the jet upwardly and rearwardly, and said channel comprising a central panel structure of rearwardly increasing width, and side panels rising from opposite lateral edges of said central panel structure and sloping upwardly and laterally outwardly therefrom.

5. A jet deflector for deflecting the high temperature jet issuing from the nozzle of the jet engine of an aircraft comprising a frame adapted to be positioned behind the nozzle, ground-engaging means secured to said frame for supporting said frame above the ground, an upwardly-facing channel carried on top of said frame and having an open forward end to receive the jet from said nozzle, said channel extending rearwardly and upwardly from said forward end to an open rear end to direct the jet upwardly and rearwardly, said channel comprising an upwardly sloping bottom wall and rearwardly divergent side walls which incline upwardly and laterally.

6. A jet deflector for deflecting the high temperature jet issuing from the nozzle of the jet engine of an aircraft comprising a frame adapted to be positioned behind the nozzle, ground-engaging means secured to said frame for supporting said frame above the ground, an upwardly-facing channel carried on top of said frame and having an open forward end to receive the jet from said nozzle, said channel extending rearwardly and upwardly from said forward end to an open rear end to direct the jet upwardly and rearwardly, and said channel comprising contiguous panels which are secured to said frame at their distal ends only so as to be free for thermal expansion and contraction independently of said frame and of one another.

7. A jet deflector for deflecting the high temperature jet issuing from the nozzle of the jet engine of an aircraft comprising a frame adapted to be positioned behind the nozzle, releasable ground-engaging means secured to said frame for supporting said frame above the ground against movement relative to the ground, an upwardly-facing trough-shaped channel carried on top of said frame, said channel having an open forward end to receive the jet from said nozzle, said channel extending upwardly and rearwardly from said forward end to an open rear end to direct the jet upwardly and rearwardly, and said channel increasing in width rearwardly.

8. A jet deflector for deflecting the high temperature jet issuing from the nozzle of the jet engine of an aircraft comprising a frame adapted to be positioned behind the nozzle, an upwardly-facing trough-shaped channel carried on top of said frame, said channel having an open forward end to receive the jet from said nozzle, said channel extending upwardly and rearwardly from said forward end to direct the jet upwardly and rearwardly, and means for holding said frame against movement including a flexible element adapted to connect said frame to the aircraft.

9. A jet deflector for deflecting the high temperature jet issuing from the nozzle of the jet engine of an aircraft comprising a frame adapted to be positioned behind the nozzle, ground-engaging means secured to said frame for supporting said frame above the ground, an upwardly-facing channel carried on top of said frame, said channel having an open forward end to receive the jet from said nozzle, said channel being trough-shaped and gradually sloping upwardly and rearwardly from its forward end and flaring outwardly in the rearward direction to direct the rearwardly expanding jet upwardly and rearwardly.

MAYNARD D. SHUMAKER.

REFERENCES CITED

The following references are of record in the file of this patent:

UNITED STATES PATENTS

| Number | Name | Date |
|---|---|---|
| D. 112,480 | Koch | Dec. 6, 1938 |
| 470,410 | Pangle | Mar. 8, 1892 |
| 748,637 | McDonald | Jan. 5, 1904 |
| 1,173,801 | Hess | Feb. 29, 1916 |
| 1,874,406 | Wright | Aug. 30, 1932 |
| 1,925,139 | Fellers | Sept. 5, 1933 |
| 1,941,669 | Erskine | Jan. 2, 1934 |
| 2,229,653 | Hohl | Jan. 28, 1941 |
| 2,469,659 | Martin | May 10, 1949 |

FOREIGN PATENTS

| Number | Country | Date |
|---|---|---|
| 3,391 | Great Britain | of 1913 |